(12) United States Patent
Chang et al.

(10) Patent No.: US 10,715,191 B2
(45) Date of Patent: Jul. 14, 2020

(54) METHOD FOR CHARACTERIZING NONLINEAR DISTORTION OF TRANSMITTER, ASSOCIATED TRANSMITTER AND CHARACTERIZATION CIRCUIT THEREOF

(71) Applicant: Realtek Semiconductor Corp., HsinChu (TW)

(72) Inventors: Yuan-Shuo Chang, Hsinchu (TW); Shin-Lin Cheng, Hsinchu (CN)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 16/691,631

(22) Filed: Nov. 22, 2019

(65) Prior Publication Data

US 2020/0186176 A1 Jun. 11, 2020

Related U.S. Application Data

(60) Provisional application No. 62/778,276, filed on Dec. 11, 2018.

(30) Foreign Application Priority Data

Jul. 3, 2019 (TW) .............................. 108123352 A

(51) Int. Cl.
*H04B 1/04* (2006.01)
(52) U.S. Cl.
CPC .................................. *H04B 1/0475* (2013.01)
(58) Field of Classification Search
None
See application file for complete search history.

(56) References Cited

U.S. PATENT DOCUMENTS 6,798,843 B1 * 9/2004 Wright ................... H03F 1/3241
330/149
2005/0032472 A1 * 2/2005 Jiang .................... H04B 1/0475
455/13.4

(Continued)

OTHER PUBLICATIONS

Taijun Liu, Slim Boumaiza, Mohamed Helaoui, Haykel Ben Nasr and Fadhel M. Ghannouchi, "Behavior Modeling Procedure of Wideband RF Transmitters Exhibiting Memory Effects", Jun. 17, 2005, IEEE, USA.

*Primary Examiner* — Lana N Le
(74) *Attorney, Agent, or Firm* — Winston Hsu

(57) ABSTRACT

A method for characterizing nonlinear distortion of a transmitter, an associated transmitter and a characterization circuit thereof are provided. The method includes: utilizing a transmitting chain circuit within the transmitter to generate an output signal according to a test signal; utilizing a loop back circuit within the transmitter to generate a loop back signal according to the output signal; calculating a plurality of distorted indices respectively corresponding to a plurality of test samples of the test signal according to a plurality of loop back samples of the loop back signal, wherein the plurality of test samples correspond to the plurality of loop back samples, respectively; dividing the plurality of distortion indices into multiple groups according to power of the plurality of test samples; calculating an average value of distortion indices within each group of the multiple groups; and characterizing the nonlinear distortion of the transmitter according to the average value.

20 Claims, 4 Drawing Sheets

(56) References Cited

U.S. PATENT DOCUMENTS

| | | | |
|---|---|---|---|
| 2005/0243946 A1* | 11/2005 | Chung | H03F 1/3247 375/297 |
| 2008/0187035 A1* | 8/2008 | Nakamura | H03F 3/245 375/232 |
| 2009/0091384 A1* | 4/2009 | Sorrells | H03F 1/0294 330/207 R |
| 2011/0074506 A1* | 3/2011 | Kleider | H04L 27/3863 330/149 |
| 2011/0187454 A1* | 8/2011 | Fudaba | H03F 1/3247 330/149 |
| 2013/0336376 A1* | 12/2013 | Do | H04B 17/13 375/227 |
| 2015/0028947 A1* | 1/2015 | Lozhkin | H03G 3/3042 330/149 |
| 2015/0187348 A1* | 7/2015 | Kang | G10L 21/0208 381/66 |
| 2015/0349838 A1* | 12/2015 | Petrovic | H03G 3/20 375/221 |
| 2018/0083812 A1* | 3/2018 | Williams | H04L 1/208 |
| 2018/0167093 A1* | 6/2018 | Miyazaki | H04B 17/101 |

* cited by examiner

METHOD FOR CHARACTERIZING NONLINEAR DISTORTION OF TRANSMITTER, ASSOCIATED TRANSMITTER AND CHARACTERIZATION CIRCUIT THEREOF

CROSS REFERENCE TO RELATED APPLICATIONS

This application claims the benefit of U.S. Provisional Application No. 62/778,276, which was filed on Dec. 11, 2018, and is included herein by reference. This application further claims the benefit of Taiwan Application No. 108123352, which was filed on Jul. 3, 2019, and is included herein by reference.

BACKGROUND OF THE INVENTION

1. Field of the Invention

The present invention is related to characterizing nonlinear distortion, and more particularly, to a method for characterizing nonlinear distortion of a transmitter, an associated transmitter and a characterization circuit thereof.

2. Description of the Prior Art

Circuits such as power amplifiers in radio frequency (RF) systems may have severe nonlinear effects, which results in a performance of the RF system degrading. In order to overcome this problem, before the RF system normally operates, the nonlinear effects in the RF system need to be analyzed first. The RF system may then operate according to the analysis result to eliminate or reduce signal distortion caused by the nonlinear effects.

For the purpose of eliminating or reducing signal distortion caused by nonlinear effects, the aforementioned step of analysis regarding the nonlinear effects is quite important. If the analysis result is not accurate enough, resulting in the nonlinear effects in the RF system being incorrectly estimated, subsequent operations cannot solve the problem of signal distortion, and overall performance might even become worse.

SUMMARY OF THE INVENTION

Thus, an objective of the present invention is to provide a method for characterizing nonlinear distortion of a transmitter, an associated transmitter and a characterization circuit thereof, to properly estimate nonlinear distortion of a transmitter in a radio frequency (RF) system.

Another objective of the present invention is to provide a method for characterizing nonlinear distortion of a transmitter, an associated transmitter and a characterization circuit thereof, to solve the problem of the related art without introducing any side effect or in a way that is less likely to introduce side effects.

At least one embodiment of the present invention provides a method for characterizing nonlinear distortion of a transmitter. The method comprises: utilizing the transmitter to generate an output signal according to a test signal; generating a loop back signal according to the output signal; calculating a plurality of distortion indices respectively corresponding to a plurality of test samples of the test signal according to a plurality of loop back samples of the loop back signal, wherein the plurality of test samples correspond to the plurality of loop back samples, respectively; dividing the plurality of distortion indices into multiple groups according to power of the plurality of test samples; calculating an average value of distortion indices within each group of the multiple groups; and characterizing the nonlinear distortion of the transmitter according to the average value.

At least one embodiment of the present invention further provides a transmitter. The transmitter may comprise a transmitting chain circuit, a loop back circuit and a characterization circuit, wherein the loop back circuit is coupled to the transmitting chain circuit, and the characterization circuit is coupled to the loop back circuit. The transmitting chain circuit may be configured to generate an output signal according to a test signal, the loop back circuit may be configured to receive the output signal to generate a loop back signal according to the output signal, and the characterization circuit may be configured to characterize nonlinear distortion of the transmitter according to the loop back signal. More particularly, the characterization circuit calculates a plurality of distortion indices respectively corresponding to a plurality of test samples of the test signal according to a plurality of loop back samples of the loop back signal, wherein the plurality of test samples correspond to the plurality of loop back samples, respectively; the characterization circuit divides the plurality of distortion indices into multiple groups according to power of the plurality of test samples; the characterization circuit calculates an average value of distortion indices within each group of the multiple groups; and the characterization circuit characterizes the nonlinear distortion of the transmitter according to the average value.

At least one embodiment of the present invention further provides a characterization circuit for characterizing nonlinear distortion of a transmitter (e.g. a characterization circuit of the transmitter), wherein the transmitter may generate an output signal according to a test signal, and the characterization circuit may receive a loop back signal of the output signal. For example, the characterization circuit calculates a plurality of distortion indices respectively corresponding to a plurality of test samples of the test signal according to a plurality of loop back samples of the loop back signal, wherein the plurality of test samples correspond to the plurality of loop back samples, respectively; the characterization circuit divides the plurality of distortion indices into multiple groups according to power of the plurality of test samples; the characterization circuit calculates an average value of distortion indices within each group of the multiple groups; and the characterization circuit characterizes the nonlinear distortion of the transmitter according to the average value.

The present invention divides a plurality of distortion indices into groups according to power of a plurality of test samples (e.g. corresponding test samples), and calculates an average distortion index of each group to obtain a feature (e.g. a characterization curve) of nonlinear distortion of a transmitter for subsequent pre-distortion processing. As embodiments of the present invention will not greatly increase additional costs, the present invention can solve the problem of the related art without introducing any side effect or in a way that is less likely to introduce side effects.

These and other objectives of the present invention will no doubt become obvious to those of ordinary skill in the art after reading the following detailed description of the preferred embodiment that is illustrated in the various figures and drawings.

DETAILED DESCRIPTION

For the purpose of preventing overall performance of a radio frequency (RF) system from degrading due to nonlinear effects of circuits therein, a manner of pre-distortion can be utilized to eliminate or reduce signal distortion caused by the nonlinear effects. In some embodiments, the RF system may utilize a characterization circuit to characterize nonlinear distortion of a transmitter within the RF system to generate a nonlinear characterization function of the transmitter, and generate an inverse function of the nonlinear characterization function according to the nonlinear characterization function, for the RF system to perform pre-distortion processing on signals. Before transmitting a signal, the RF system may perform pre-distortion processing on the signal to generate a pre-distorted signal, and then send out the pre-distorted signal via the transmitter. As mentioned above, the step of generating the nonlinear characterization function is quite important. Thus, the present invention provides a method for characterizing nonlinear distortion of a transmitter, an associated transmitter and a characterization circuit thereof.

Figure 1:
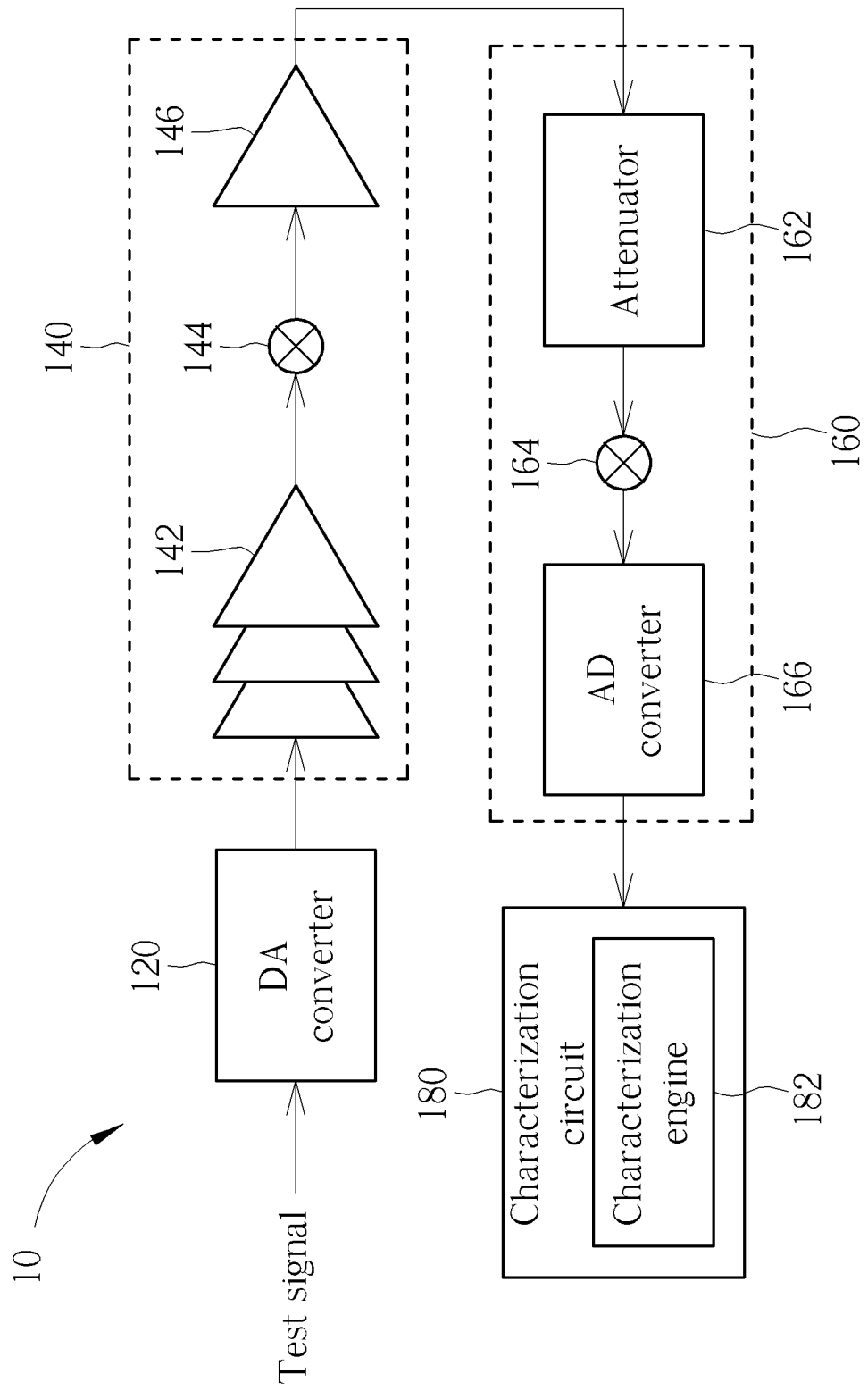
FIG. 1 is a diagram illustrating a transmitter according to an embodiment of the present invention.

FIG. 1 is a diagram illustrating a transmitter 10 according to an embodiment of the present invention, where transmitter 10 may comprise a digital-to-analog (DA) converter 120, a transmitting chain circuit 140 coupled to the DA converter 120, a loop back circuit 160 coupled to the transmitting chain circuit 140, and a characterization circuit 180 coupled to the loop back circuit 160.

In this embodiment, the transmitting chain circuit 140 may comprise a filter circuit 142 (which may be one or more filter units connected in series, wherein the one or more filter units may comprise low-pass filter(s), high-pass filter(s) and/or band-pass filter(s)), an up-converter 144 (which may comprise at least one mixer) coupled to the filter circuit 142, and a power amplifier 146 coupled to the up-converter 144. In addition, the loop back circuit 160 may comprise an attenuator 162, a down-converter 164 (which may comprise at least one mixer) coupled to the attenuator 162, and an analog-to-digital (AD) converter 166 coupled between the down-converter 164 and the characterization circuit 180.

In this embodiment, the transmitting chain circuit 140 may receive a test signal to generate an output signal according to the test signal. In another embodiment, the transmitter 10 comprises a storage circuit (not shown) configured to store a predetermined test signal, where the storage circuit may be any type of memory or storage device. The transmitting chain circuit 140 may generate an output signal according to the predetermined test signal. The DA converter 120 may perform DA conversion on the test signal to generate an analog test signal (e.g. an analog signal of the test signal). The filter circuit 142 may receive the analog test signal and filter the analog test signal to generate a filtered signal. The up-converter 144 may up-convert the filtered signal to generate an up-converted signal. The power amplifier 146 may receive the up-converted signal to output the output signal. Then, the loop back circuit 160 may receive the output signal to generate a loop back signal according to the output signal. In an embodiment, the loop back circuit 160 and the characterization circuit 180 are internal circuits of the transmitter 10, which may be designed to receive the output signal via an antenna or without an antenna, but the present invention is not limited thereto. In another embodiment, the loop back circuit 160 and the characterization circuit 180 are external circuit(s) outside the transmitter 10, and the loop back circuit 160 may receive the output signal of the transmitter 10 via an antenna. The attenuator 162 may receive the output signal and reduce amplitude of the output signal to generate an attenuated signal. The down-converter 164 may down-convert the attenuated signal to generate a down-converted signal. The AD converter 166 may perform AD conversion on the down-converted signal to generate the loop back signal.

In this embodiment, the characterization circuit 180 may comprise a characterization engine 182, where the characterization engine 182 may utilize operator units (e.g. arithmetic units) and logic units within the characterization engine 182 to perform arithmetic operations and logical operations related to characterizing nonlinear distortion of the transmitter 10, to allow the characterization circuit 180 to characterize nonlinear distortion of the transmitter 10 according to the loop back signal. In another embodiment, the characterization circuit 180 comprises a storage circuit (not shown) configured to store a test signal, where the storage circuit may be any type of memory or storage device. For better comprehension, the test signal may be represented by a plurality of test samples x(1), x(2), ... and x(N), and the loop back signal may be represented by a plurality of loop back samples y(1), y(2), ... and y(N), where N is a positive integer, and the test samples x(1), x(2), ... and x(N) respectively correspond to the loop back samples y(1), y(2), ... and y(N). The characterization circuit 180 may calculate a plurality of distortion indices (e.g. amplitude-to-amplitude (AMAM) distortion indices AMAM (1), AMAM(2), ... and AMAM(N) or amplitude-to-phase (AMPM) distortion indices AMPM(1), AMPM(2), ... and AMPM(N)) respectively corresponding to the test samples x(2), ... and x(N) according to the loop back samples y(1), y(2), ... and y(N), where calculation of an AMAM distortion index and an AMPM distortion index corresponding to a test sample x(n) is shown as follows:

$$AMAM(n) = 10 \times \log_{10}(|y(n)|^2) - 10 \times \log_{10}(|x(n)|^2);$$

$$AMPM(n) = \arctan\left(\frac{img(y(n))}{real(y(n))}\right) - \arctan\left(\frac{img(x(n))}{real(x(n))}\right);$$

where n is a positive integer within an interval [1, n].

It should be noted that, for the purpose of conforming to specifications or rules established by institutions of different countries or regions (such as Federal Communications Commission (FCC) and CE marking of European Union), the test signal should be a wideband signal (e.g. a signal having 20 MHz bandwidth generated by a modulator), rather than a signal having single tone (or single frequency). Further, in another embodiment, the transmitter 10 in FIG. 1 may be a transceiver which includes both transmitting circuit and receiving circuit.

Figure 2:
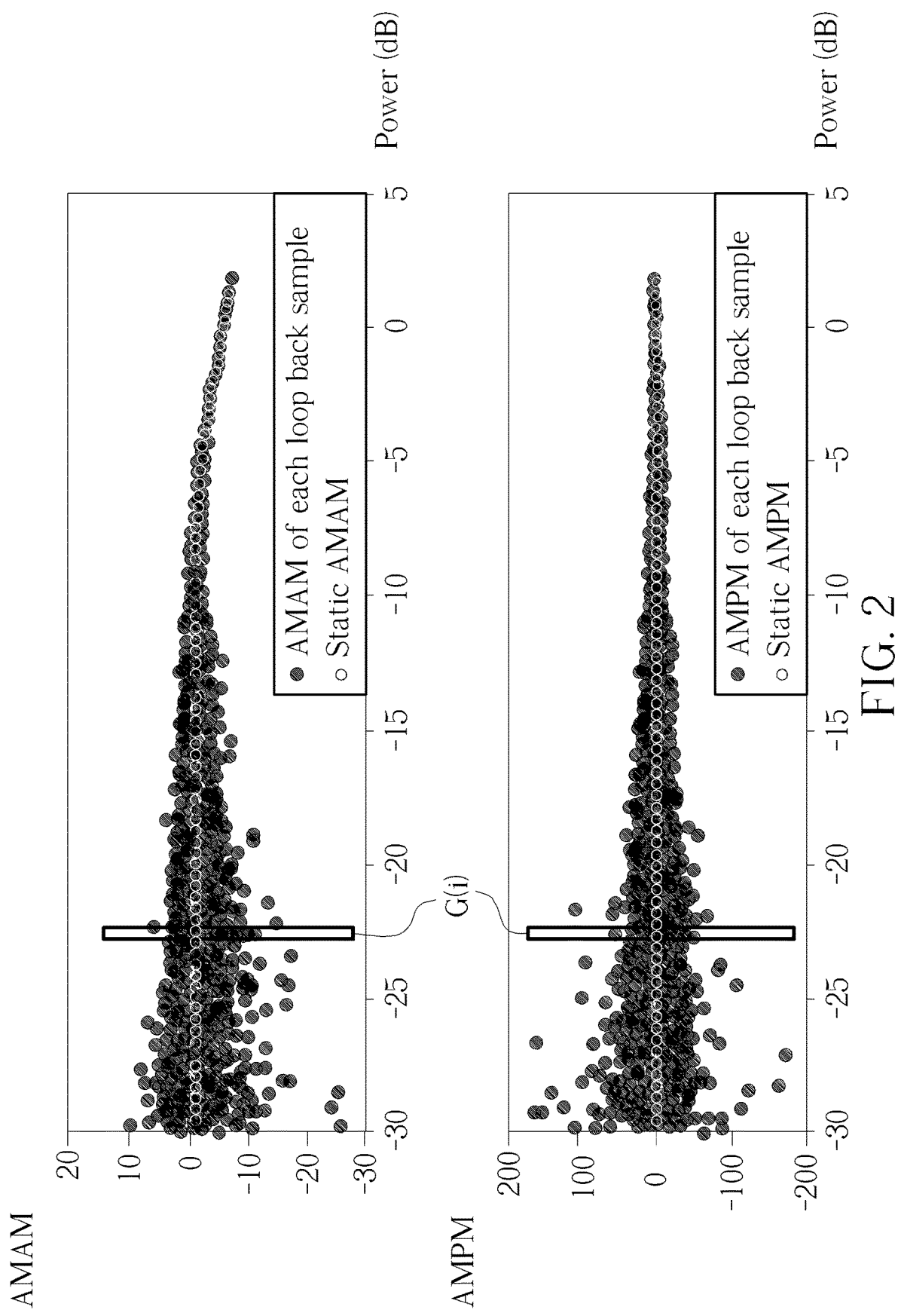
FIG. 2 illustrates amplitude-to-amplitude (AMAM) distortion indices and amplitude-to-phase (AMPM) distortion indices obtained by calculation based on a loop back signal according to an embodiment of the present invention.

FIG. 2 illustrates AMAM distortion indices and AMPM distortion indices obtained by calculation based on the loop back signal according to an embodiment of the present invention. As shown in FIG. 2, the characterization circuit 180 may divide the plurality of AMAM distortion indices into multiple groups such as K groups G(1), G(2), ... and G(K) according to power of the test samples x(1), x(2), ... and x(N) (e.g. power |x(n)|² of each of the test samples), where K is a positive integer. Taking a group G(i) (where i is a positive integer within an interval [1, K]) as an example, the group G(i) may comprise one or more distortion indices (e.g. one or more of the AMAM distortion indices AMAM(1), AMAM(2), ... and AMAM(N) and/or one or more of AMPM distortion indices AMPM(1), AMPM(2), ... and AMPM(N)) corresponding to test samples (e.g. one or more of the test samples x(1), x(2), ... and x(N)) having −22.5 dB power, indicated by solid circles in FIG. 2. Thus, test samples corresponding to distortion indices within a same group have the same power, or power of these test samples fall in a same range. In practice, the transmitting chain circuit 140 may have a memory effect, which makes input signals having the same power have different AMAM distortion indices and/or AMPM distortion indices when being output at different time points, such as multiple different AMAM distortion indices and/or AMPM distortion indices within the group G(i). For example, x(1) and x(n) may have the same power, but the AMAM(1) and the AMAM(n) may be different (and/or the AMPM(1) and the AMPM(n) may be different). In order to eliminate impact of the aforementioned memory effect upon the AMAM distortion indices and the AMPM distortion indices, the characterization circuit 180 may calculate an average value (e.g. static AMAM distortion indices and static AMPM distortion indices as shown in figures, which are indicated by hollow circles in FIG. 2) of distortion indices within each group of the multiple groups, where an average value of distortion indices within the group G(i) may be configured to represent a distortion index (e.g. an AMAM distortion index and/or an AMPM distortion index) corresponding to the test samples having the −22.5 dB power. As each aforementioned group has a static AMAM distortion index and/or a static AMPM distortion index, the characterization circuit 180 may characterize the nonlinear distortion of the transmitter 10 according to the static AMAM distortion index and/or the static AMPM distortion index. For example, static AMAM distortion indices shown in the upper-half of FIG. 2 may form a characterization curve representing the nonlinear distortion of the transmitter 10, and an inverse curve can be generated according to the characterization curve generated by the characterization circuit 180, for a pre-distortion circuit (not shown) coupled to input terminal (s) of the DA converter 120 within the transmitter 10 to perform pre-distortion processing and signal compensation, where the inverse curve may be obtained by utilizing an adaptive algorithm (such as a least mean square (LMS) algorithm), but the present invention is not limited thereto. In another example, static AMPM distortion indices shown in the lower-half of FIG. 2 may form another characterization curve for representing the nonlinear distortion of the transmitter 10, and another inverse curve can be generated according to the other characterization curve generated by the characterization circuit 180, for the pre-distortion circuit coupled to the input terminal (s) of the DA converter 120 within the transmitter 10 to perform pre-distortion processing and signal compensation, where the other inverse curve may be obtained by utilizing the adaptive algorithm (such as the least mean square (LMS) algorithm), but the present invention is not limited thereto.

In this embodiment, the characterization circuit 180 may make the groups G(1), G(2), ... and G(K) respectively correspond to −30 dBm−30+D dB, ... and −30+(K−1)*D dB, which means the characterization circuit 180 divides the plurality of distortion indices into K groups in units of D dB, and D and K are not limited to specific values. For example, the characterization circuit 180 may divide the plurality of distortion indices into thirty groups in fixed units of 0.5 dB from −30 dB to 0 dB, but the present invention is not limited thereto. In another example, the characterization circuit 180 may divide the plurality of distortion indices into multiple groups in different units, e.g. make the groups G(1), G(2), ... and G(K) respectively correspond to −30 dB, −25 dB, −22.5 dB, ... etc., but the present invention is not limited thereto. In addition, a power range of a test sample corresponding to each of the groups G(1), G(2), ..., G(K) may vary. For example, the group G(i) may comprise distortion indices corresponding to all test samples having the power fall in an interval [−22 dB, −23 dB]; in another example, the group G(i) may comprise distortion indices corresponding to all test samples having the power fall in an interval [−20 dB, −25 dB]; where the power range of test sample corresponding to each of the groups G(1), G(2), ..., G(K) may be deduced by analogy, but the present invention is not limited thereto. In some embodiments, a number of the aforementioned multiple groups and a power value/range corresponding to each group may be determined according to hardware architecture of the aforementioned pre-distortion circuit, but the present invention is not limited thereto.

Figure 3:
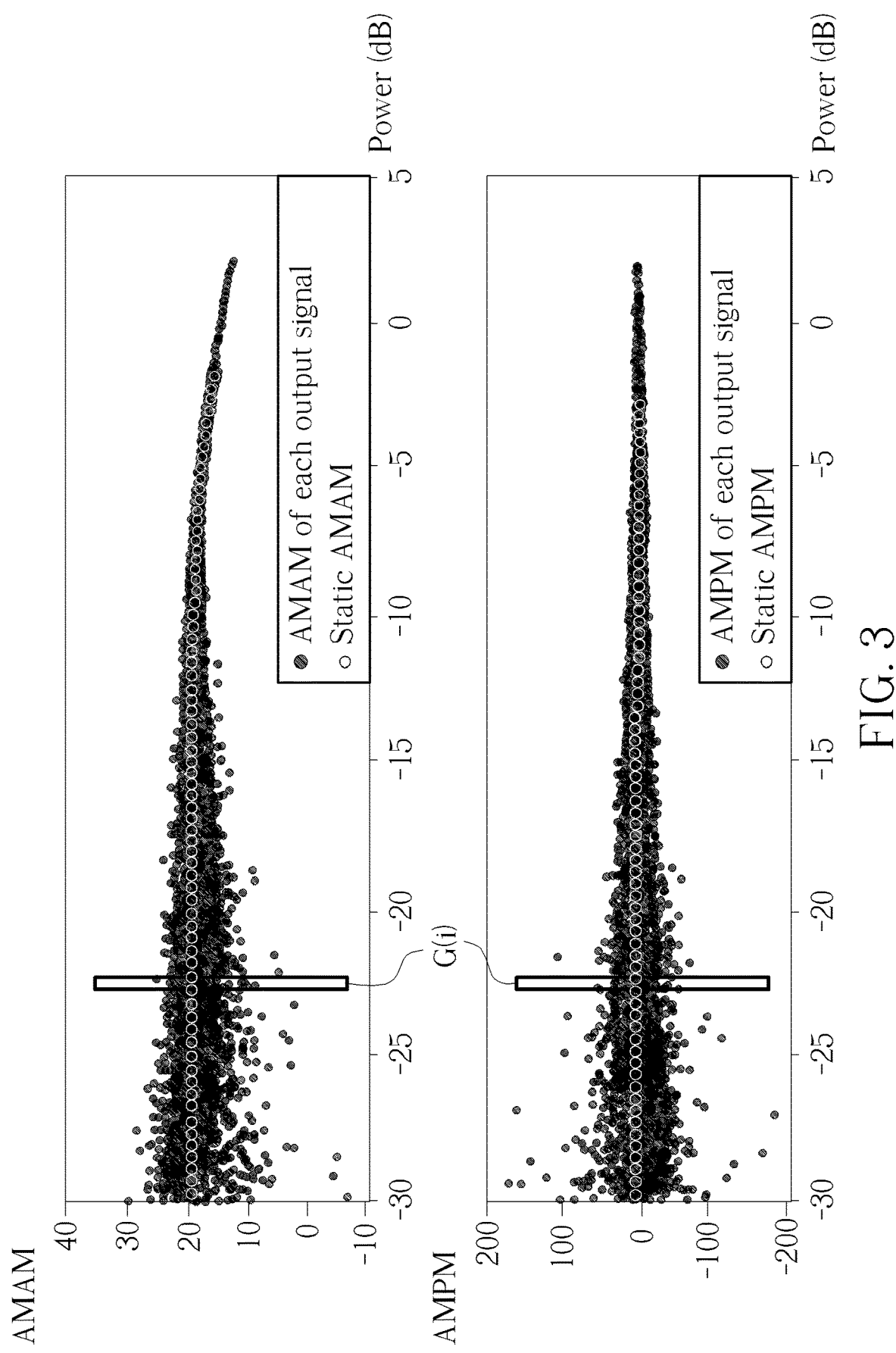
FIG. 3 illustrates AMAM distortion indices and AMPM distortion indices obtained by calculation based on an output signal according to an embodiment of the present invention.

FIG. 3 illustrates AMAM distortion indices and AMPM distortion indices obtained by calculation based on the output signal according to an embodiment of the present invention. In this embodiment, the transmitting chain circuit 140 might have a specific gain (such as 20 dB) which amplifies the output signal. Thus, in comparison with the result calculated based on the loop back signal as shown in FIG. 2, the AMAM distortion indices obtained by calculation based on the output signal may also have this specific gain. When normally operating (e.g. transmitting signals to the outside), the RF system may transmit the output signal via an antenna coupled to the transmitting chain circuit 140, the aforementioned operation of characterizing the nonlinear distortion of the transmitter 10 is performed upon the transmitting chain circuit 140. In order to prevent nonlinear effects of the loop back circuit 160 being included, the attenuator 162 may reduce amplitude or power of the output signal to generate the attenuated signal, where an attenuation amount of the attenuated signal is determined according to linearity and signal to noise ratio (SNR) of the down-converter 164 and the AD converter 166. For example, the greater the attenuation amount (e.g. the less the amplitude or power of the attenuated signal), the less the linearity issue of the down-converter 164 and the AD convert 166 being included; however, the less the amplitude or power of the attenuated signal, the worse the SNR. Thus, the design of the attenuator 162 (e.g. the attenuation amount of the attenuator 162) needs to consider the linearity and SNR together.

Figure 4:
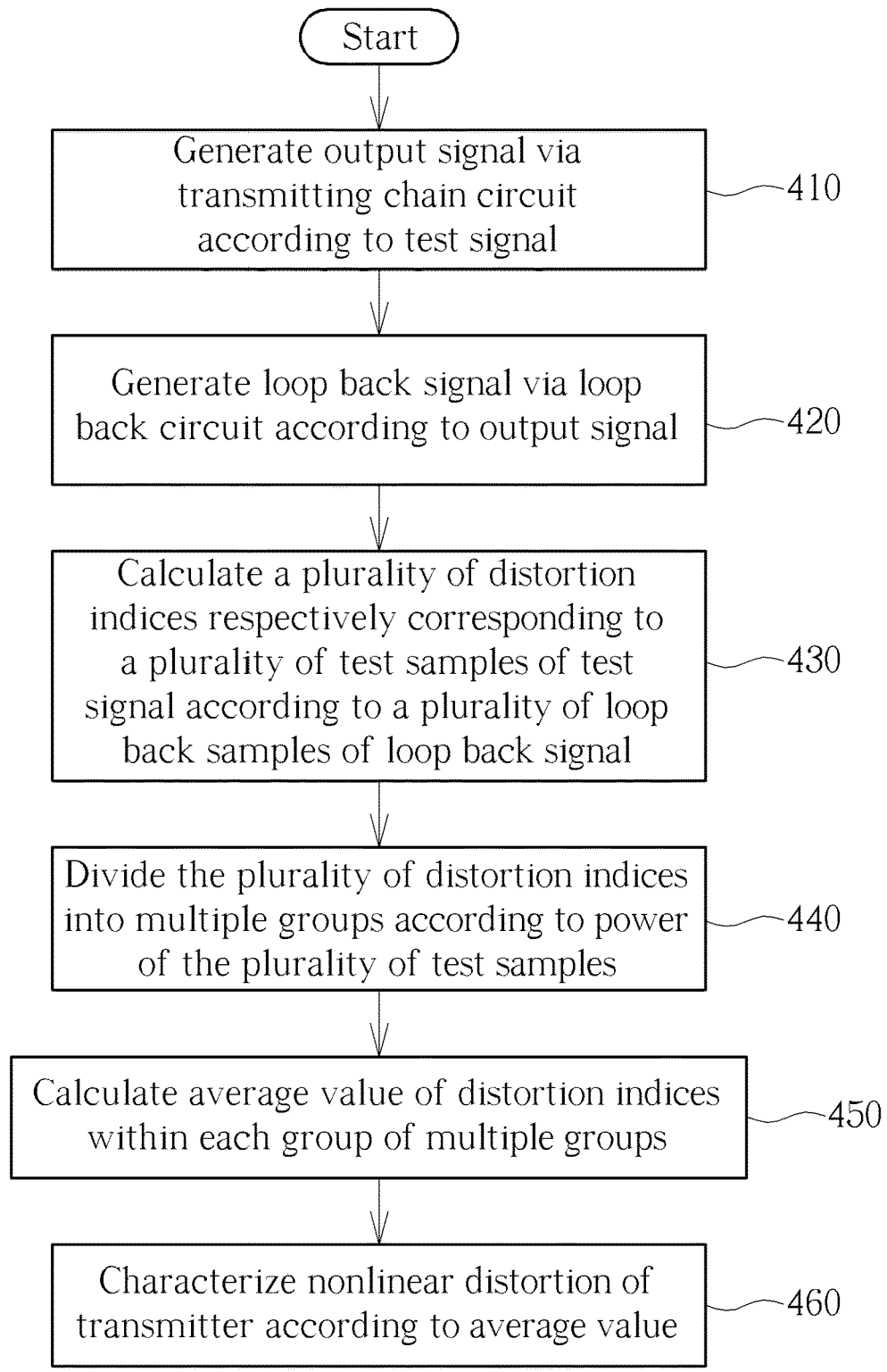
FIG. 4 is a flowchart of a method for characterizing nonlinear distortion of a transmitter according to an embodiment of the present invention.

The method for characterizing nonlinear distortion of a transmitter disclosed in the present invention may be illustrated by FIG. 4, which is a flowchart of the method according to an embodiment of the present invention. For better comprehension, refer to FIG. 4 in conjunction with FIG. 1.

In Step 410, the transmitting chain circuit 140 may generate an output signal according to a test signal.

In Step 420, the loop back circuit 160 may generate a loop back signal according to the output signal.

In Step 430, the characterization circuit 180 may calculate a plurality of distortion indices respectively corresponding to a plurality of test samples of the test signal according to a plurality of loop back samples of the loop back signal, wherein the plurality of test samples correspond to the plurality of loop back samples, respectively.

In Step 440, the characterization circuit 180 may divide the plurality of distortion indices into multiple groups according to power of the plurality of test samples.

In Step 450, the characterization circuit 180 may calculate an average value of distortion indices within each group of the multiple groups.

In Step 460, the characterization circuit 180 may characterize the nonlinear distortion of the transmitter (e.g. the transmitter 10) according to the average value.

In an embodiment of the present invention, the aforementioned operation of characterizing the nonlinear distortion of the transmitter may be performed every time when the transmitter is powered on. In another embodiment of the present invention, the transmitter may periodically perform the aforementioned operation of characterizing the nonlinear distortion of the transmitter before starting to normally transmit signals for communications, to keep updating the nonlinear distortion of the transmitter, in order to guarantee information of the nonlinear distortion is correct in response to different operating conditions for pre-distortion processing. It should be noted that the aforementioned method and steps may be implemented by hardware, software or firmware according to design requirements.

To summarize, the present invention inputs a wideband signal to a transmitter and generates an output signal, and then performs processing on the output signal and transmits it to a characterization circuit within the transmitter via a loop back circuit within the transmitter. In addition, the characterization circuit eliminates the memory effect by an average manner to obtain static distortion indices, to provide the characterization circuit with the nonlinear distortion, making the transmitter able to perform pre-distortion processing and signal compensation. In addition, the aforementioned method of utilizing the average manner to eliminate the memory effect will not greatly increase hardware resource and calculation. Thus, the present invention can solve the problem of the related art without introducing any side effect or in a way that is less likely to introduce side effects.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for characterizing nonlinear distortion of a transmitter, comprising:
   utilizing the transmitter to generate an output signal according to a test signal;
   generating a loop back signal according to the output signal;
   calculating a plurality of distortion indices respectively corresponding to a plurality of test samples of the test signal according to a plurality of loop back samples of the loop back signal, wherein the plurality of test samples correspond to the plurality of loop back samples, respectively;
   dividing the plurality of distortion indices into multiple groups according to power of the plurality of test samples;
   calculating an average value of distortion indices within each group of the multiple groups; and
   characterizing the nonlinear distortion of the transmitter according to the average value.

2. The method of claim 1, wherein the step of characterizing the nonlinear distortion of the transmitter according to the average value comprises:
   generating a static distortion index according to the average value, wherein respective static distortion indices respectively corresponding to the multiple groups forms a characterization curve.

3. The method of claim 2, further comprising:
   generating an inverse curve according to the characterization curve related to the respective static distortion indices; and
   utilizing the inverse curve to perform pre-distortion processing upon the transmitter.

4. The method of claim 1, wherein the plurality of distortion indices comprises a plurality of amplitude-to-amplitude (AMAM) distortion indices or a plurality of amplitude-to-phase (AMPM) distortion indices.

5. The method of claim 1, wherein the test signal is a wideband signal.

6. The method of claim 1, wherein a number of the multiple groups, and a range and a value of power corresponding to each group is determined according to a pre-distortion circuit.

7. The method of claim 1, wherein the step of utilizing the transmitter to generate the output signal according to the test signal comprises utilizing a transmitting chain circuit within the transmitter to generate the output signal according to the test signal, and the step of generating the loop back signal according to the output signal comprises utilizing a loop back circuit within the transmitter to receive the output signal to generate the loop back signal according to the output signal.

8. The method of claim 7, wherein the step of utilizing the transmitting chain circuit within the transmitter to generate the output signal according to the test signal comprises:
   performing digital-to-analog conversion upon the test signal via a digital-to-analog converter to generate an analog signal;
   receiving the analog signal via a filter circuit within the transmitting chain circuit to generate a filtered signal;
   up-converting the filtered signal via an up-converter within the transmitting chain circuit to generate an up-converted signal; and
   receiving the up-converted signal via a power amplifier within the transmitting chain circuit to output the output signal.

9. The method of claim 8, wherein the step of utilizing the loop back circuit within the transmitter to receive the output signal to generate the loop back signal according to the output signal comprises:
   reducing amplitude of the output signal via an attenuator within the loop back circuit to generate an attenuated signal;
   down-converting the attenuated signal via a down-converter within the loop back circuit to generate a down-converted signal; and
   performing analog-to-digital conversion upon the down-converted signal via an analog-to-digital converter within the loop back circuit to generate the loop back signal.

10. The method of claim 9, wherein an attenuation amount of the attenuated signal generated by the attenuator is determined according to linearity and signal to noise ratio (SNR) of the down-converter and the analog-to-digital converter.

11. A transmitter, comprising:
a transmitting chain circuit, configured to generate an output signal according to a test signal;
a loop back circuit, coupled to the transmitting chain circuit, configured to generate a loop back signal according to the output signal;
a characterization circuit, coupled to the loop back circuit, configured to characterize nonlinear distortion of the transmitter according to the loop back signal, wherein:
the characterization circuit calculates a plurality of distortion indices respectively corresponding to a plurality of test samples of the test signal according to a plurality of loop back samples of the loop back signal, wherein the plurality of test samples correspond to the plurality of loop back samples, respectively;
the characterization circuit divides the plurality of distortion indices into multiple groups according to power of the plurality of test samples;
the characterization circuit calculates an average value of distortion indices within each group of the multiple groups; and
the characterization circuit characterizes the nonlinear distortion of the transmitter according to the average value.

12. The transmitter of claim 11, wherein the characterization circuit generates a static distortion index according to the average value, and respective static distortion indices respectively corresponding to the multiple groups forms a characterization curve.

13. The transmitter of claim 12, wherein the characterization circuit generates an inverse curve according to the characterization curve related to the respective static distortion indices, and the transmitter utilizes the inverse curve to perform pre-distortion processing.

14. The transmitter of claim 11, further comprising:
a digital-to-analog converter, configured to perform digital-to-analog conversion upon the test signal to generate an analog signal and transmit the analog signal to the transmitting chain circuit;
wherein the transmitting chain circuit comprises:
a filter circuit, coupled to the digital-to-analog converter, configured to receive the analog signal to generate a filtered signal;
an up-converter, configured to up-convert the filtered signal to generate an up-converted signal; and
a power amplifier, configured to receive the up-converted signal to output the output signal.

15. The transmitter of claim 14, wherein the loop back circuit comprises:
an attenuator, coupled to the power amplifier, configured to reduce amplitude of the output signal to generate an attenuated signal;
a down-converter, coupled to the attenuator, configured to down-convert the attenuated signal to generate a down-converted signal; and
an analog-to-digital converter, coupled to the down-converter, configured to perform analog-to-digital conversion upon the down-converted signal to generate the loop back signal.

16. A characterization circuit for characterizing nonlinear distortion of a transmitter, the transmitter generating an output signal according to a test signal, the characterization circuit receiving a loop back signal of the output signal, wherein:
the characterization circuit calculates a plurality of distortion indices respectively corresponding to a plurality of test samples of the test signal according to a plurality of loop back samples of the loop back signal, wherein the plurality of test samples correspond to the plurality of loop back samples, respectively;
the characterization circuit divides the plurality of distortion indices into multiple groups according to power of the plurality of test samples;
the characterization circuit calculates an average value of distortion indices within each group of the multiple groups; and
the characterization circuit characterizes the nonlinear distortion of the transmitter according to the average value.

17. The characterization circuit of claim 16, wherein the transmitter comprises:
a transmitting chain circuit, configured to receive the test signal to generate the output signal; and
a loop back circuit, coupled to the transmitting chain circuit, configured to generate the loop back signal according to the output signal;
wherein the characterization circuit receives the loop back signal of the output signal via the loop back circuit.

18. The characterization circuit of claim 16, wherein the characterization circuit generates a static distortion index according to the average value, and respective static distortion indices respectively corresponding to the multiple groups forms a characterization curve.

19. The characterization circuit of claim 18, wherein the characterization circuit generates an inverse curve according to the characterization curve related to the respective static distortion indices, and the transmitter performs pre-distortion processing according to the inverse curve.

20. The characterization circuit of claim 16, wherein the plurality of distortion indices comprise a plurality of amplitude-to-amplitude (AMAM) distortion indices or a plurality of amplitude-to-phase (AMPM) distortion indices.

* * * * *

UNITED STATES PATENT AND TRADEMARK OFFICE
CERTIFICATE OF CORRECTION

PATENT NO. : 10,715,191 B2
APPLICATION NO. : 16/691631
DATED : July 14, 2020
INVENTOR(S) : Yuan-Shuo Chang et al.

Page 1 of 1

It is certified that error appears in the above-identified patent and that said Letters Patent is hereby corrected as shown below:

On the Title Page

Item (72), correct the citizenship of the second inventor from "Hsinchu (CN)" to --Hsinchu (TW)--.

Signed and Sealed this
First Day of September, 2020

Andrei Iancu
*Director of the United States Patent and Trademark Office*